Sept. 3, 1946.　　　C. F. FITZGERALD　　　2,406,753
SOLE PRESSING MACHINE
Filed May 7, 1945

Inventor
Charles F. Fitzgerald
By his Attorney

Patented Sept. 3, 1946

2,406,753

UNITED STATES PATENT OFFICE 2,406,753

SOLE PRESSING MACHINE

Charles F. Fitzgerald, Beverly, Mass., assignor to United Shoe Machinery Corporation, Flemington, N. J., a corporation of New Jersey Application May 7, 1945, Serial No. 592,294

2 Claims. (Cl. 12—38)

This invention relates to shoe machines, and is herein illustrated as embodied in a machine for pressing soles against the bottoms of lasted shoes.

In the pressing of soles against the bottoms of shoes it is common to use a pressure-box one wall of which comprises a multilayer flexible diaphragm. A diaphragm composed of a single sheet of rubber or other suitable material may be used if desired, but it is preferable to use a plurality of comparatively thin layers since the principal wear is caused by contact with the shoe, and when a plurality of layers are used, the outer one may readily be removed and replaced.

When, however, a multilayer diaphragm is used, air tends to become trapped between the outer layer, one face of which is exposed to the atmosphere, and the inner layer, one face of which is exposed to the fluid in the pressure-box; and, when pressure is applied to cause the sole to be pressed against the bottom of a shoe, this trapped air is liable to collect more or less in one spot and strain or burst the outer layer which is in contact with the shoe.

There is sometimes used a third layer which is located between the inner and the outer layers, but this third layer is smaller than the others and is loose between them. Since it is not fastened to the rim of the pressure-box as are the other two layers, it does not interfere with the expulsion of air as described below. Such interleaved loose layers will therefore be disregarded in the description of the invention, it being understood that the term "outer layer" refers to a layer one face of which is exposed to the atmosphere and that the term "inner layer" refers to a layer one face of which is commonly exposed to the fluid in the pressure-box.

In order to remedy the difficulty of trapped air there is provided, in accordance with the invention, a machine of the general type outlined above having a pressure-box, a multilayer diaphragm in which the outer layer is provided with a one-way valve, and means for expelling, through said valve from the space between the outer and the inner layer, air which may have lodged between the layers.

This and other features of the invention, including certain details of construction and combinations of parts, will now be described as embodied in an illustrated machine and pointed out in the appended claims.

Referring to the accompanying drawing.

Figure 1:
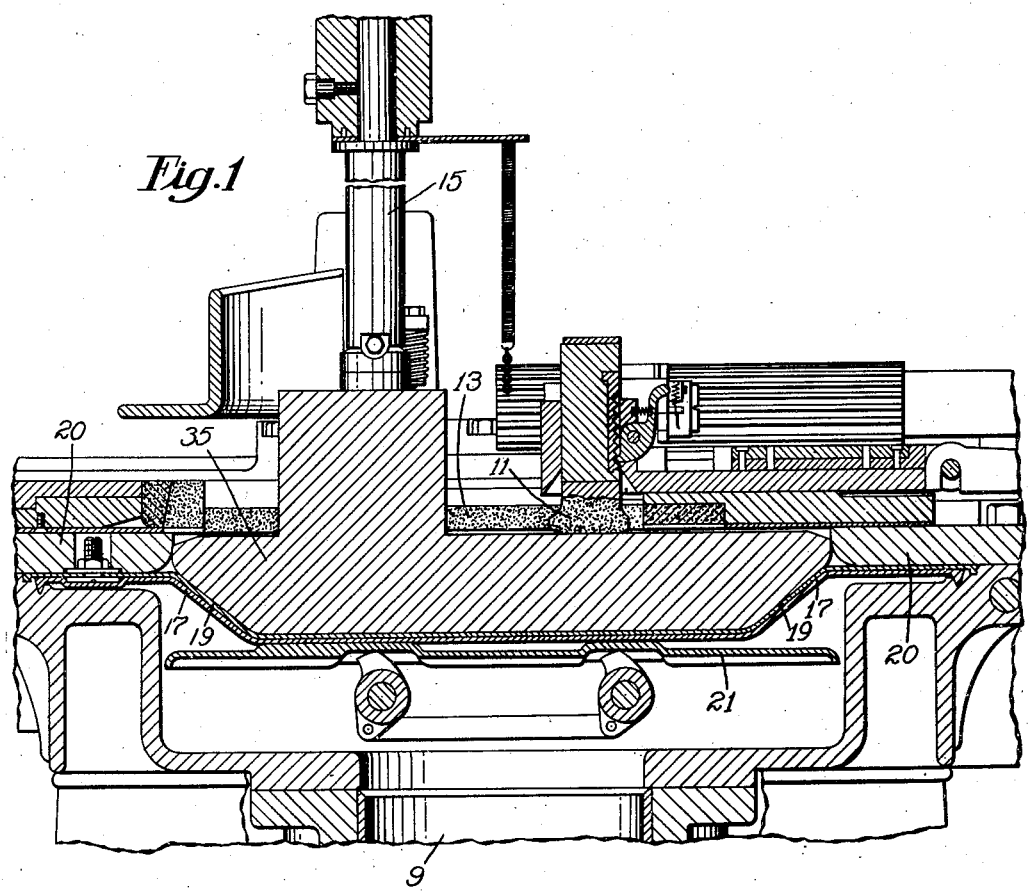
Figure 1 is a vertical longitudinal section through a sole pressing machine having a two-layer diaphragm, an expeller in the form of a pressing block being shown in the place normally occupied by a shoe and with the parts in the positions in which air has been expelled.
Figure 3:
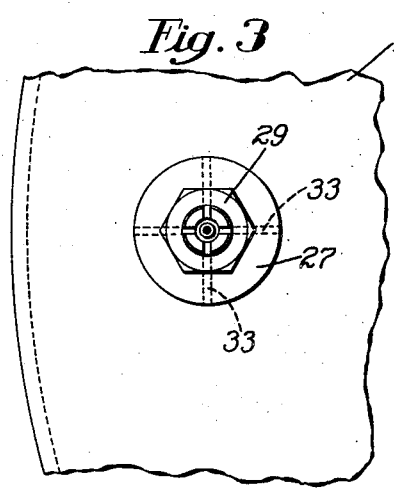
Figure 3 is a plan view on the same scale as Figure 2 of part of the outer layer of the diaphragm and its valve.

The illustrated machine, aside from what is new, is or may be the same as the machine shown in United States Letters Patent No. 1,920,977, granted August 8, 1933, upon an application filed in the name of Sidney J. Finn. Referring first to Figure 1, which is much like Figure 3 of the patent, except that a block is shown in place of a shoe, the general mode of operation of the machine will be briefly described.

Normally, that is, when the machine is at rest and there is no shoe in it, the pressure-box 7 is only partly filled with water, by reason of the fact that the piston (not shown) in the cylinder 9 has moved down and drawn some of the water or other fluid from the pressure-box. The toe-pad 11 and the side-plates, one of which is shown at 13, have been moved away from the shoe which rested upon the diaphragm, and the jack-post 15 has been swung to one side to permit the shoe to be removed preparatory to pressing another sole upon the bottom of another shoe. The layers 17, 19 of the diaphragm are provided with projections on their under sides which are received in suitably shaped grooves formed in the frame of the pressure-box 7, and are clamped in place by a flat ring 20 which is fastened to the rim of the pressure-box by cap-screws (not shown). The lower or inner layer 17 of the diaphragm is molded to provide a depression of some depth to receive the lower portion of a shoe, and the upper or outer layer 19 has molded in it two depressions, usually of less depth than that of the lower portion. The layers sag somewhat, since no pressure is being exerted upon them, the lower layer 17 resting upon a plate 21 which is held from movement toward the bottom of the pressure-box.

With the parts of the machine in these positions, a shoe with a sole properly located upon its bottom is placed on the diaphragm, and a treadle (not shown) is depressed, whereupon the following movements take place. The jack-post is swung in over the top of the last of the shoe, and the toe-pad is moved in and down over the toe portion of the shoe. The side-plates are moved in until they contact with the sides of the shoe, and then the piston in the cylinder 9 is moved up to force water into the pressure-box so as to press the sole against the shoe. This pressure is maintained for a short interval, and then water is withdrawn from the pressure-box, the sideplates and the toe-plate are withdrawn, and the jack-post, which supported the shoe against pressure applied through the diaphragm, is swung to one side. No further description of what is old will be given, reference being made to the patent for details of construction not described above.

Figure 2:
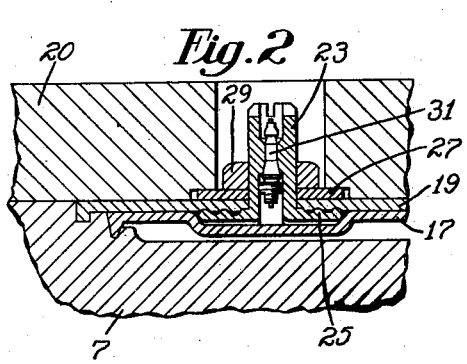
Figure 2 is a sectional view on a greatly enlarged scale of the valve in the margin of the outer layer and its mounting.

The present invention, as has been stated, provides means for eliminating air which may be trapped between the outer and the inner layers of the diaphragm. In the illustrated machine, practically all of such air is expelled by being squeezed out before the machine is used to press soles. To this end the outer layer 19 of the diaphragm carries in its margin a valve structure, as best shown in Figure 2, the stem 23 of which extends up into a hole bored in the clamping ring 20, the upper end of the hole being open to the atmosphere. This stem 23 has a generally flat head 25 which is provided with a corrugated face on the side which engages the layer 19, said layer being clamped between the corrugated face of the flat head 25 and a disk 27 by means of a hexagonal nut 29 threaded on the exterior of the stem 23. The valve proper 31 is threaded into the hollow stem 23, and its interior is constructed and arranged to permit air to flow out from the spaced between the layers 17, 19 into the atmosphere, and to prevent the flow of air in the opposite direction. In order to permit the expulsion of practically all such air, the lower face of the flat head is provided with grooves 33.

The air is expelled by means of an expeller, herein shown as a block 35, which in longitudinal section has roughly the shape of the last of a shoe, but has an operative portion which practically fills the space bounded by the clamping ring 20, said block having a flat lower face and an upwardly inclined bevel on its margin. This block is placed in the machine in the place normally occupied by a shoe, and then the machine is operated as usual, Figure 1 showing the position of parts when fluid has been pumped into the pressure-box to press the diaphragm against the lower face of the block. It should be noted that the valve (that is, the exit for the air) is located at a high point in the layer 19; and this location of the valve, together with the shape of the block 20, insures that practically all of the air will be expelled from between the layers 17, 19. Theoretically, one expulsion of air will be sufficient, after which the machine may be used to press soles against the bottom of shoes until the outer layer of the diaphragm is removed and replaced; but, of course, the expelling means may be used whenever desired.

Although the present invention has been described as embodied in a machine of the type in which fluid is forced into a pressure-box to cause power to be applied beneath the diaphragm so as to press the diaphragm toward the bottom of the block or the bottom of a shoe, it should be understood that the invention is not limited in the scope of its application to the particular machine or type of machine which has been shown and described.

Having thus described my invention, what I claim as new and desire to secure by Letters Patent of the United States is:

1. A machine for pressing a sole against the bottom of a shoe, said machine having, in combination, a pressure-box one wall of which comprises a flexible diaphragm including an inner layer one face of which is exposed to the interior of the pressure-box and an outer layer extending over the inner layer and having one face exposed to the atmosphere, and means for expelling air from between the layers prior to using the machine for pressing soles, said means including an expeller which may be located upon the outer layer of the diaphragm in place of a shoe, a one-way valve in said outer layer constructed and arranged to permit air to flow from the space between the layers and to prevent air from returning to said space, and means for causing the diaphragm and the expeller to be pressed together to expel air through the valve.

2. A layer of flexible material adapted to form the outer layer of a multilayer flexible diaphragm which extends over the otherwise open side of a pressure-box, said outer layer having mounted in the margin thereof a valve constructed and arranged to permit air to be forced through it in a direction to escape from beneath the outer layer, but to prevent air from passing in the opposite direction.

CHARLES F. FITZGERALD.